United States Patent
Van Hecke et al.

(10) Patent No.: US 11,520,442 B1
(45) Date of Patent: Dec. 6, 2022

(54) INDUSTRIAL AUTOMATION DISPLAY DEVICE WITH TOUCHSCREEN

(71) Applicant: ROCKWELL AUTOMATION TECHNOLOGIES, INC., Mayfield Heights, OH (US)

(72) Inventors: John Van Hecke, Hartland, WI (US); Mark S. Williams, Waukesha, WI (US); Christopher Genthe, West Bend, WI (US); Garron Morris, Whitefish Bay, WI (US); Paul Leone, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/400,461

(22) Filed: Aug. 12, 2021

(51) Int. Cl.
*G06F 3/044* (2006.01)
*G02F 1/1333* (2006.01)
*G06F 3/041* (2006.01)

(52) U.S. Cl.
CPC ........ *G06F 3/044* (2013.01); *G02F 1/133308* (2013.01); *G06F 3/0412* (2013.01)

(58) Field of Classification Search
CPC ... G06F 3/044; G06F 3/0412; G02F 1/133308
See application file for complete search history.

(56) References Cited

U.S. PATENT DOCUMENTS

| | | | |
|---|---|---|---|
| 5,017,736 A * | 5/1991 | Yarger | H05K 9/0001 174/364 |
| 6,034,335 A | 3/2000 | Aufderheide et al. | |
| 2013/0241841 A1 * | 9/2013 | Orsley | G06F 3/0412 345/173 |
| 2018/0113351 A1 * | 4/2018 | Wada | G02F 1/133308 |
| 2020/0272255 A1 * | 8/2020 | Panchawagh | G06F 3/0383 |

OTHER PUBLICATIONS

Chemical Resistance Monitors and Touch Screens, Arista Corp., https://www.goarista.com/blog/chemical-resistance-monitors-touch-screens/ (last visited Aug. 12, 2021). Retrieved on Aug. 12, 2021.
Industrial Display News and Announcements, Hope Ind. Sys., https://www.hopeindustrial.com/blog (last visited Aug. 12, 2021). Retrieved on Aug. 12, 2021.
Touch Screen Conductive Silver Inks and Insulating Dielectric Inks, Creative Materials Inc., http://creativematerials.com/applications/touch-screens/ (last visited Aug. 12, 2021). Retrieved on Aug. 12, 2021.

* cited by examiner

*Primary Examiner* — Peter D McLoone
(74) *Attorney, Agent, or Firm* — Fletcher Yoder, P.C.

(57) ABSTRACT

A touchscreen for a display device may include a top layer, a bottom layer, and a middle layer between the top layer and the bottom layer. The touchscreen may also include a deposited material that extends around a perimeter of the touchscreen. A length of the deposited material has a length that extends from at least a first portion of the top layer to at least a second portion of the bottom layer. The deposited material may form a seal over the middle layer between the touchscreen and an environment of the display device.

20 Claims, 2 Drawing Sheets

INDUSTRIAL AUTOMATION DISPLAY DEVICE WITH TOUCHSCREEN

BACKGROUND

The disclosure generally relates to touchscreen display devices. More particular, embodiments of the present disclosure are related to assembling components of a touchscreen for a display device to prevent or minimize the passage of corrosive gas into the body of the touchscreen.

An industrial automation system may include one or more touchscreen display devices to display information relating to monitoring and/or regulating industrial automation equipment in the industrial automation system. In certain types of industrial automation systems, a touchscreen display device may be exposed to corrosive gases that might be present in an environment of the industrial automation systems. Such corrosive gases may be the byproduct of an industrial process, may be used during the industrial process to achieve some purpose, or may be present in the environment surrounding the industrial automation system for some other reason. The corrosive gases may permeate the body of a touchscreen of the display device and negatively affect certain materials present within the body of the touchscreen, or otherwise reduce the lifespan or operability of the touchscreen. For instance, the touchscreen may contain certain functional circuit constructs made of materials, such as silver and copper, that are susceptible to corrosion should the functional circuit constructs come into contact with the corrosive gases. As such, it may be desirable to provide an improved touchscreen display device that prevents or minimizes the passage of corrosive gasses into the body of the touchscreen.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a touchscreen display device may include a touchscreen disposed in a housing. The touchscreen includes a top layer, a middle layer, and a bottom layer. The touchscreen display device may also include an overlay optically bonded to the top layer of the touchscreen and a deposited material that extends around a perimeter of the touchscreen within the housing. A length of the deposited material may extend from at least a first portion of the overlay to at least a second portion of the bottom layer. The deposited material forms a seal over the middle layer between the touchscreen and an environment of the touchscreen display device.

In another embodiment, a touchscreen for a display device includes a top layer, a bottom layer, and a middle layer between the top layer and the bottom layer. The touchscreen also includes a deposited material that extends around a perimeter of the touchscreen. A length of the deposited material has a length that extends from at least a first portion of the top layer to at least a second portion of the bottom layer. The deposited material may form a seal over the middle layer between the touchscreen and an environment of the display device.

In yet another embodiment, a method includes assembling a touchscreen that includes a top layer, a bottom layer, and a middle layer between the top layer and the bottom layer; and applying a deposited material that extends around a perimeter of the touchscreen, wherein a length of the deposited material extends from at least a first portion of the top layer to at least a second portion of the bottom layer, wherein the deposited material forms a seal over the middle layer between the touchscreen and an environment of the touchscreen.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
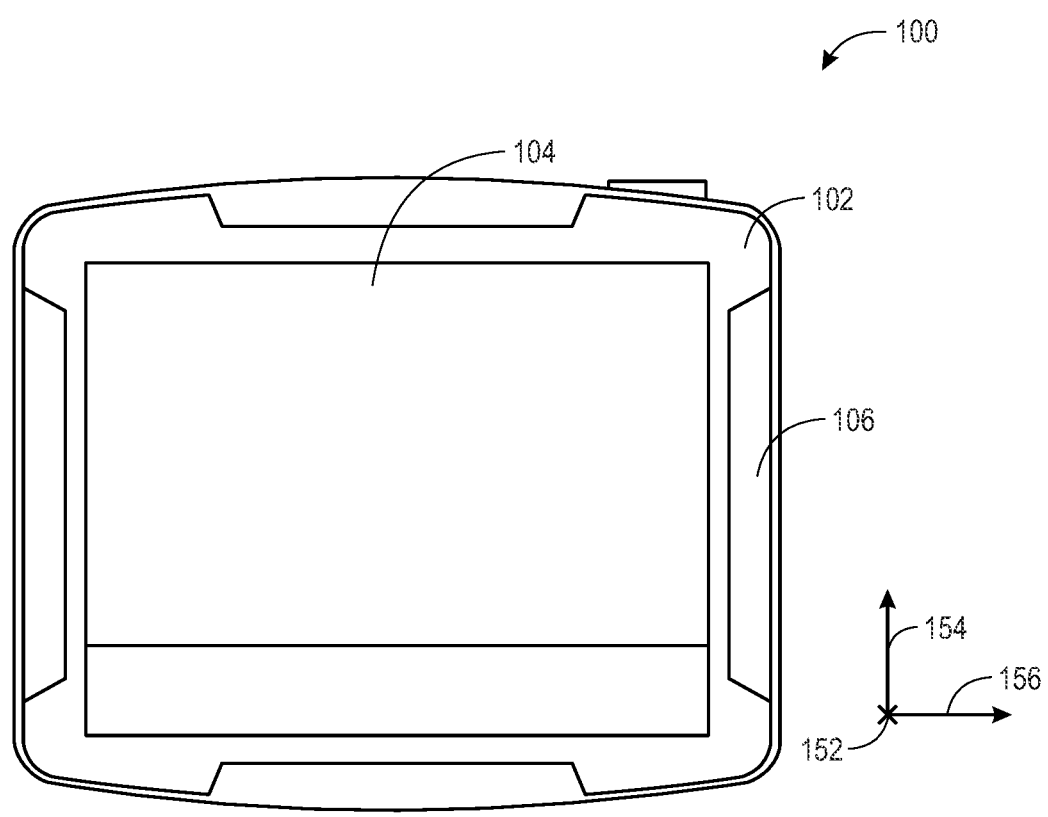
FIG. 1 is a front view of a touchscreen display device that may be utilized in an industrial automation system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to an improved touchscreen display device and an improved technique for assembling the touchscreen display device that may prevent or minimize the passage of gases (e.g., corrosive gases) from entering the body of a touchscreen of the touchscreen display device. As mentioned above, in certain types of industrial automation systems, corrosive gases may permeate the body of the touchscreen and negatively affect certain materials within the body of the touchscreen. For example, a resistive touchscreen may be constructed of several layers: a top layer with a transparent conductive coating on the bottom, a middle layer, and a bottom glass layer with a transparent conductive coating on the top. The transparent conductive coating on the top layer and the bottom glass layer may have traces of printed conductive material, such as silver or copper, which is susceptible to corrosion.

In order to prevent or minimize passage of corrosive gases into the middle layer, the improved touchscreen display device and the improved technique for assembling the touchscreen display device may utilize a protective material or a sacrificial material (i.e., "a deposited material") to coat at least an exterior portion of the touchscreen. For instance, the deposited material may extend over the middle layer (e.g., from the top polyester-coated layer to the bottom glass layer) to seal the middle layer from the environment of the touchscreen display device. In certain embodiments, the deposited material may include a conformal coat material, such as an acrylic-based coat material, an epoxy-based coat material, a polyurethane-based coat material, a silicone-based coat material, a parylene-based coat material, a fluoropolymer-based coat material; a urethane; a caulk, such as a sacrificial copper-impregnated caulk and/or a sacrificial silver-impregnated caulk; or the like. By utilizing the deposited material to seal the middle layer, the integrity of the touchscreen may be maintained in a corrosive environment, thereby extending the lifespan of the touchscreen display device and improving its operability in the corrosive environment.

Although certain embodiments of the disclosure are described with respect to components of a resistive touchscreen, it should be understood that such techniques may be used with any suitable type of touchscreen device to prevent or minimize passage of corrosive gases into the interior of the touchscreen device. For example, such techniques may be used to seal the body of a projected capacitive touchscreen from the environment of the projected capacitive touchscreen or any other suitable type of touchscreen device.

To facilitate discussion of FIGS. 1-3, the touchscreen display device 100 and its components may be described with reference to a longitudinal axis or direction 152, a vertical axis or direction 154, and a lateral axis or direction 156. With the foregoing in mind, FIG. 1 is a front view of the touchscreen display device 100 that may be used to monitor or regulate industrial automation devices or industrial automation equipment in an industrial automation system. For example, the touchscreen display device 100 may be utilized to present information and/or control various operations associated with the industrial automation devices, the industrial automation equipment, the industrial system, or the like. Although certain embodiments of the touchscreen display device 100 are described herein with regard to monitoring or regulating industrial automation devices or industrial automation equipment in an industrial automation system, it should be understood that such embodiments are exemplary. As such, the touchscreen display device 100 may be used in any residential system, industrial system, or other suitable system (e.g., any touch system or touchscreen system).

In some embodiments, the touchscreen display device 100 may be integrated in the body of an industrial automation device or the body of industrial automation equipment. For example, such industrial automation devices or industrial automation equipment may include controllers, input/output (I/O) modules, motor control centers, motors, valves, actuators, temperature elements, pressure sensors, contactors, starters, sensors, drives, relays, protection devices, switchgear, compressors, network switches (e.g., Ethernet switches, modular-managed, fixed-managed, service-router, industrial, unmanaged, etc.), data centers, conveyor sections, movers, and the like. In other embodiments, the touchscreen display device 100 may be a stand-alone device, such as a tablet, a laptop, and the like. The industrial automation devices or the industrial automation equipment may also be related to mixers, machine conveyors, tanks, skids, specialized original equipment manufacturer machines, scanners, gauges, valves, flow meters, and the like.

The touchscreen display device 100 may be utilized to modify and/or view the settings and operations associated with the industrial automation devices, the industrial automation equipment, or the industrial system. The touchscreen display device 100 may be used to display various images generated by an industrial control system, such as a graphical user interface (GUI) for operating the industrial control system. In some embodiments, the GUI may be characterized as a human-machine interface, a human-interface machine, or the like.

As illustrated in FIG. 1, the touchscreen display device 100 may include a bezel 102, a touchscreen 104, and a housing 106. However, it should be understood that the touchscreen display device 100 may have any suitable combination of components to facilitate the presentation of information or controls associated with the industrial automation equipment or the industrial system. For example, the touchscreen display device 100 may have a power board, a logic board, a display adapter board, or the like. In some embodiments, certain components of the touchscreen display device 100 may not be visible from the front. In some embodiments, certain portions of the housing 106 of the touchscreen display device 100 may not be visible from the front.

The bezel may facilitate supporting or securing the touchscreen 104 within the touchscreen display device 100. Generally, the bezel 102 may have a shape and a size that corresponds to the shape and the size of the touchscreen 104. That is, one or more physical dimensions (e.g., length, width, or height) of the bezel 102 may correspond to one or more physical dimensions of the touchscreen 104 such that the touchscreen 104, or portion thereof, may be held or secured within the bezel 102. Although the bezel 102 and the touchscreen 104 illustrated in FIG. 1 are substantially rectangular, it should be understood that the bezel 102 and the touchscreen 104 may have any desired shape or size.

The touchscreen 104 may detect a physical touch by a user or an operator of the touchscreen display device 100. In some embodiments, the touchscreen 104 is a resistive touchscreen. For example, the resistive touchscreen may include, for example, a top layer (e.g., a top polyester-coated layer or the like) with a transparent conductive coating on a bottom side of the top layer, a middle layer, and a bottom glass layer with a transparent conductive coating on the top side of the bottom glass layer. When the user or the operator touches the top layer of the touchscreen 104, the top layer may flex in order to register the touch from the user or the operator. In other embodiments, the touchscreen is a projected capacitive touchscreen or another suitable type of touchscreen.

The touchscreen 104 may have a liquid crystal display (LCD), a light-emitting diode (LED) display, a combination LCD-LED display, an organic LED (OLED) display, a quantum dot LED (QLED) display, a plasma display, or the like. In some embodiments, an overlay may be optically bonded to the top layer of the touchscreen 104 with an optical-grade adhesive. For example, the optical-grade adhesive may include a silicon-based adhesive, an epoxy-based adhesive, a polyurethane-based adhesive, or any other suitable adhesive for eliminating an air gap between the overlay and the touchscreen 104 when bonded together. In certain embodiments, the overlay may be a polyester overlay. In certain embodiments, the area of the overlay may extend beyond the area of the top layer of the touchscreen 104.

The housing 106 of the touchscreen display device 100 may encompass or support the bezel 102 and the touchscreen 104 within the touchscreen display device 100 after assembly. The housing 106 may also encompass or support other components associated with the touchscreen display device 100. For example, such components may include a power board, a logic board, a display adapter board, or the like.

As described above, the touchscreen display device 100 may utilize a protective material or a sacrificial material (i.e., "a deposited material") to coat at least an exterior portion of the touchscreen 104 to prevent or minimize passage of gases from the ambient environment into the body (e.g., middle layer) of the touchscreen 104. With the foregoing in mind, FIG. 2 illustrates a block diagram of a portion of the touchscreen 104 supported by the bezel 102 in the touchscreen display device 100. The touchscreen 104 may have a top layer 110 (e.g., a top polyester-coated layer), a middle layer 112 (e.g., a middle adhesive layer), and a bottom layer 114 (e.g., a glass layer). In certain embodiments, the touchscreen 104 may be a resistive touchscreen, a projected capacitive touchscreen, or any other suitable type of touchscreen.

The top layer 110 may have a transparent conductive coating 130 and one or more printed traces of conductive material 131, and the bottom layer 114 may have a transparent conductive coating 132 and one or more printed traces of conductive material 133. In certain embodiments, the transparent conductive coating 130 or 132 may include indium tin oxide, graphene, silver, copper, or the like. Additionally, the traces of printed conductive material 131 or 133 may include silver, copper, or the like. As illustrated in FIG. 2, the top layer 110 has traces of a printed conductive material 131 disposed below the transparent conductive coating 130 in the middle layer 112, and the bottom layer 114 has traces of a printed conductive material 133 disposed atop the transparent conductive coating 132 in the middle layer 112. Although FIG. 2 shows traces of the printed conductive material 131 and 133 for the top layer 110 and the bottom layer 114, it should be understood that, in certain embodiments, such conductive material may be disposed on either the top layer 110 or the bottom layer 114, or both. Additionally, in certain embodiments, the top layer 110 may have a first transparent conductive coating 130 on a side facing or proximal to the bottom layer 114, or the bottom layer 114 may have a second transparent conductive coating 132 on a side facing or proximal to the top layer 110, or both (e.g., in a resistive touchscreen).

In certain embodiments, the top layer 110 may be optically bonded to an overlay 122 with an optical-grade adhesive 124. As described above, the optical-grade adhesive 124 may include a silicon-based adhesive, an epoxy-based adhesive, a polyurethane-based adhesive, or any other suitable adhesive for minimizing an air gap between the overlay 122 and the top layer 110 of the touchscreen 104 when bonded together. In some embodiments, the overlay 122 may be a polyester overlay. In some embodiments, the area of the overlay 122 may extend beyond the area of the top layer 110 of the touchscreen 104 in the vertical direction 154, the lateral direction 156, or both.

After the touchscreen 104 has been assembled together, a protective material or a sacrificial material (i.e., "a deposited material" 120) may be utilized to coat at least an exterior portion of the touchscreen 104. For instance, the deposited material 120 may extend over the middle layer 112 and around a perimeter of the touchscreen top layer 110 such that the deposited material 120 forms a seal to prevent or minimize passage of gases from the ambient environment into the middle layer 112 from the environment of the touchscreen display device 100. In certain embodiments, the deposited material 120 may include a conformal coat material, such as an acrylic-based coat material, an epoxy-based coat material, a polyurethane-based coat material, a silicone-based coat material, a parylene-based coat material, a fluoropolymer-based coat material; a urethane; a caulk, such as a sacrificial copper-impregnated caulk and/or a sacrificial silver-impregnated caulk; or the like.

Figure 2:
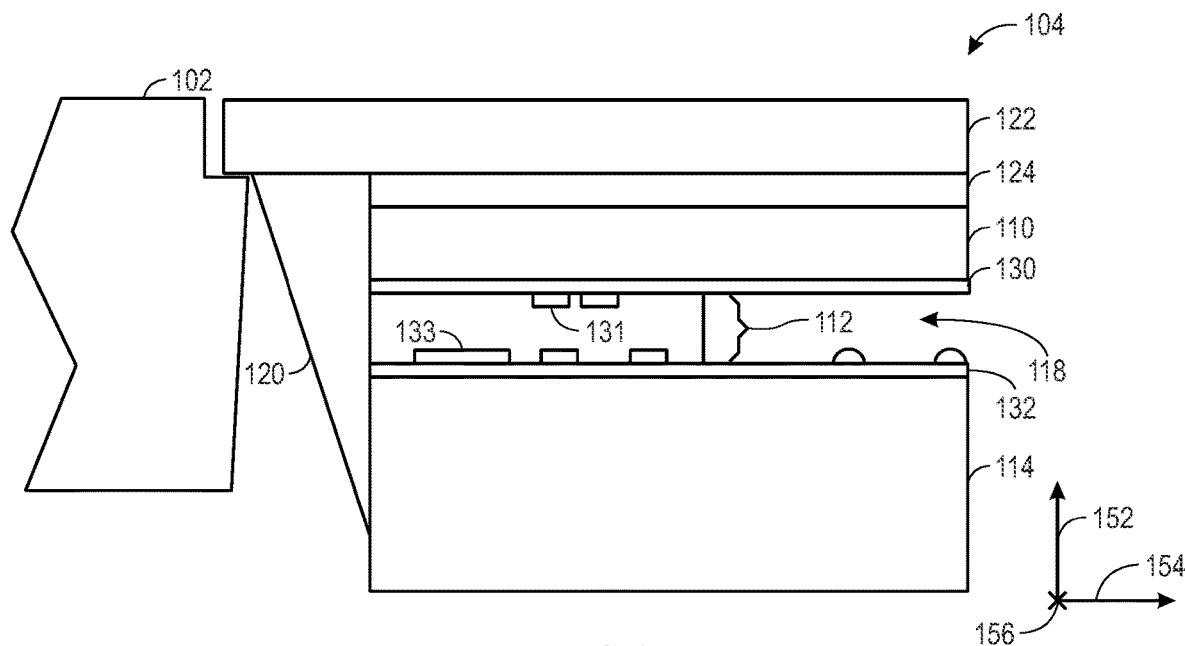
FIG. 2 is a block diagram of a portion of a touchscreen within the touchscreen display device shown in FIG. 1, in accordance with an embodiment.

As illustrated in FIG. 2, the deposited material 120 may extend from the overlay 122 to the bottom layer 114 in the longitudinal direction 152. That is, a length of the deposited material 120 may extend in the longitudinal direction 152 from at least a portion of the overlay 122, along the optical clear adhesive 124, along the top layer 110, along the first transparent conductive coating 130, along the middle layer 112, along the second transparent conductive coating 132, and at least a portion of the bottom layer 114. However, it should be understood that the length of the deposited material 120 may be any suitable length for sealing the touchscreen 104 from the environment of the touchscreen display device 102. For example, the length of the deposited material 120 may extend in the longitudinal direction 152 from at least a portion of the optical clear adhesive 124 to at least a portion of the bottom layer 114, at least a portion of the top layer 110 to at least a portion of the bottom layer 114, or the like. Additionally, the height of the deposited material 120 in the vertical direction 154 may be any suitable height or the width of the deposited material 120 in the lateral direction 156 may be any suitable width for sealing the interior of the touchscreen 112 and 118 from the environment of the touchscreen display device 104.

Additionally, as illustrated in FIG. 2, the geometric profile (e.g., a cross-section) of the deposited material 120 is triangular-shaped. However, it should be understood that the geometric profile of the deposited material 120 may be any suitable shape for maintaining a seal between the interior of the touchscreen display device 112 and 118 (e.g., the middle layer 112) and the environment of the touchscreen display device. For instance, the geometric profile of the deposited material may be rectangular-shaped, square-shaped, circular-shaped, pentagonal-shaped, hexagonal-shaped, or the like.

Although FIG. 2 shows the deposited material 120 on one side of the touchscreen 104, it should be understood that the deposited material 120 may be utilized on more than one side of the touchscreen 104 to ensure that the middle layer 112 is sealed from the environment of the touchscreen display device 100. That is, the deposited material 120 may extend around the perimeter of the touchscreen 104, or a portion thereof, to ensure the formation of the seal between the middle layer 112 and the environment of the touchscreen display device 100. Additionally, it should be understood that the illustrations of the touchscreen 104 in FIG. 2 is not to scale. That is, the respective size of each component of the touchscreen display device 100 may be any suitable size for the component, and the respective shape of each component of the touchscreen display device 100 may be any suitable shape for the component.

Figure 3:
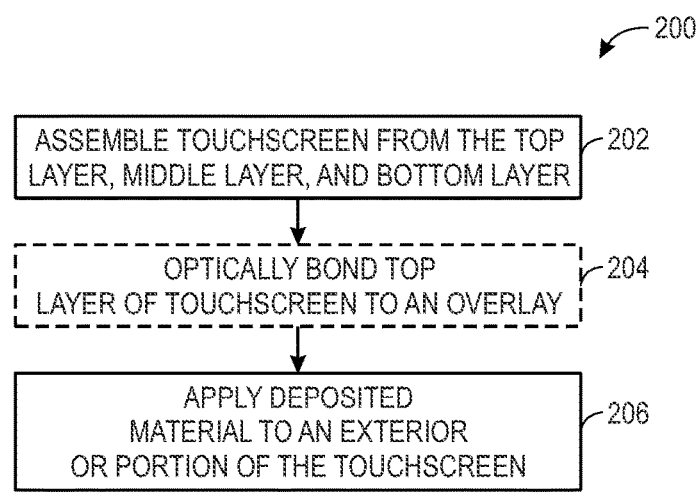
FIG. 3 is a flowchart of a method for assembling the touchscreen of the touchscreen display device utilizing a deposited material, in accordance with an embodiment.

With the foregoing in mind, FIG. 3 illustrates a flowchart of a method 200 for assembling the touchscreen 104 of the touchscreen display device 100. Although the following description of the method 200 is described in a particular order, it should be noted that the method 200 is not limited to the depicted order, and instead, the method 200 may be performed in any suitable order. Referring to FIG. 4, at block 202, the top layer 110, the middle layer 112, and the bottom layer 114 are assembled together into the touchscreen 104. In certain embodiments, the touchscreen 104 may be assembled as a resistive touchscreen, a projected capacitive touchscreen, or any other suitable type of touchscreen.

After the touchscreen 104 has been assembled, at block 204, an overlay 122 may optionally optically bonded to the top layer 110 with an optical-grade adhesive 124. As described above, the optical-grade adhesive 124 may include a silicon-based adhesive, an epoxy-based adhesive, a polyurethane-based adhesive, or any other suitable adhesive for minimizing an air gap between the overlay 122 and the top layer 110 of the touchscreen 104 when bonded together.

At block 206, a protective material or a sacrificial material (i.e., "a deposited material" 120) may be utilized to coat at least an exterior portion of the touchscreen 104. For instance, the deposited material 120 may extend over the middle layer 112 and around a perimeter of the touchscreen top layer 110 such that the deposited material 120 forms a seal to prevent or minimize passage of gases from the ambient environment into the middle layer 112 from the environment of the touchscreen display device 100. In certain embodiments, the deposited material 120 may include a conformal coat material, such as an acrylic-based coat material, an epoxy-based coat material, a polyurethane-based coat material, a silicone-based coat material, a parylene-based coat material, a fluoropolymer-based coat material; a urethane; a caulk, such as a sacrificial copper-impregnated caulk and/or a sacrificial silver-impregnated caulk; or the like.

Technical effects of the present disclosure include technique for providing an improved touchscreen display device and an improved technique for assembling the touchscreen display device that may prevent or minimize the passage of gases (e.g., corrosive gases) from the ambient environment into the body of a touchscreen of the touchscreen display device. For instance, a deposited material may form a seal between the body of the touchscreen (e.g., a middle layer) and the exterior environment of the touchscreen display device. In this way, corrosive gases may be prevented from entering the body of the touchscreen via the middle layer. Additionally, or alternatively, the deposited material may act as a sacrificial material to the gases in the ambient environment such that the corrosive gases interact with the deposited material rather than the material within the touchscreen that is susceptible to corrosion. Accordingly, by using the deposited material as a seal between the body of the touchscreen and the exterior environment of the touchscreen, the lifespan of the touchscreen display device may increase in industrial systems where corrosive gas exposure is likely.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A touchscreen display device, comprising:
   a touchscreen disposed in a housing, wherein the touchscreen comprises:
   a top layer including a top surface and a bottom surface;
   a bottom layer including a top surface; and
   a middle layer between the top layer and the bottom layer, wherein the bottom surface of the top layer has one or more printed traces of conductive material that extend into the middle layer, and wherein the top surface of the bottom layer includes one or more additional printed traces of conductive material that extend into the middle layer;
   an overlay optically bonded to the top surface of the top layer of the touchscreen; and
   a deposited material that extends around a perimeter of the touchscreen within the housing, wherein a length of the deposited material extends from at least a first portion of the overlay to at least a second portion of the bottom layer, wherein the deposited material is configured to form a seal over the middle layer between the touchscreen and an environment of the touchscreen display device.

2. The touchscreen display device of claim 1, wherein the deposited material comprises a conformal coat material.

3. The touchscreen display device of claim 2, wherein the conformal coat material comprises an acrylic-based material.

4. The touchscreen device of claim 2, wherein the conformal coat material comprises a polyurethane-based material.

5. The touchscreen device of claim 2, wherein the conformal coat material comprises a silicone-based material.

6. The touchscreen device of claim 2, wherein the conformal coat material comprises a parylene-based material.

7. The touchscreen device of claim 2, wherein the conformal coat material comprises a fluoropolymer-based material.

8. The touchscreen display device of claim 1, wherein the deposited material comprises a sacrificial copper-impregnated caulk.

9. The touchscreen display device of claim 1, wherein the deposited material comprises a sacrificial silver-impregnated caulk.

10. The touchscreen display device of claim 1, wherein the overlay is optically bonded to the top surface of the top layer of the touchscreen using an optical-grade adhesive.

11. The touchscreen device of claim 10, wherein the bottom surface of the top layer has a conductive coating and the one or more printed traces of conductive material extend from the conductive coating into the middle layer, and the top surface of the bottom layer has an additional conductive coating and the one or more additional printed traces of conductive material extend from the additional conductive coating into the middle layer.

12. The touchscreen device of claim 11, wherein the deposited material extends from at least the first portion of the overlay, along the optical-grade adhesive, along the top layer, along the conductive coating, over the middle layer, and along the additional conductive coating to at least the second portion of the bottom layer.

13. A touchscreen for a display device, comprising:
- a top layer including a top surface and a bottom surface;
- a bottom layer including a top surface;
- a middle layer between the top layer and the bottom layer, wherein the bottom surface of the top layer includes one or more printed traces of conductive material that extend into the middle layer, and wherein the top surface of the bottom layer includes one or more additional printed traces of conductive material that extend into the middle layer; and
- a deposited material that extends around a perimeter of the touchscreen, wherein a length of the deposited material extends from at least a first portion of the top layer to at least a second portion of the bottom layer, and wherein the deposited material is configured to form a seal over the middle layer between the touchscreen and an environment of the display device.

14. The touchscreen of claim 13, wherein the deposited material comprises a conformal coat material.

15. The touchscreen of claim 13, wherein the deposited material comprises a sacrificial caulk.

16. The touchscreen of claim 13, wherein the touchscreen is configured to be integrated within a body of an industrial automation device.

17. The touchscreen of claim 13, wherein the deposited material is impermeable to corrosive gas.

18. A method, comprising:
- assembling a touchscreen that comprises a top layer including a top surface and a bottom surface, a bottom layer including a top surface, and a middle layer between the top layer and the bottom layer, wherein the bottom surface of the top layer includes one or more printed traces of conductive material that extend into the middle layer, and wherein the top surface of the bottom layer includes one or more additional printed traces of conductive material that extend into the middle layer; and
- applying a deposited material that extends around a perimeter of the touchscreen, wherein a length of the deposited material extends from at least a first portion of the top layer to at least a second portion of the bottom layer, wherein the deposited material is configured to form a seal over the middle layer between the touchscreen and an environment of the touchscreen.

19. The method of claim 18, wherein the touchscreen is a resistive touchscreen.

20. The method of claim 18, wherein the touchscreen is a projected capacitive touch screen.

\* \* \* \* \*